US008147697B2

(12) United States Patent
Al-Jlil

(10) Patent No.: US 8,147,697 B2
(45) Date of Patent: Apr. 3, 2012

(54) APPARATUS AND PROCESS FOR DESALINATION OF BRACKISH WATER

(75) Inventor: Saad A Al-Jlil, Riyadh (SA)

(73) Assignee: King Abdulaziz City for Science and Technology (KACST), Riyadh (SA)

( * ) Notice: Subject to any disclaimer, the term of this patent is extended or adjusted under 35 U.S.C. 154(b) by 0 days.

(21) Appl. No.: 13/175,860

(22) Filed: Jul. 3, 2011

(65) Prior Publication Data
US 2011/0259822 A1 Oct. 27, 2011

(51) Int. Cl.
*B01D 15/04* (2006.01)
*B01D 35/18* (2006.01)
*B01D 63/00* (2006.01)
*B01D 3/10* (2006.01)

(52) U.S. Cl. ..... 210/640; 210/650; 210/175; 210/257.2; 210/195.2; 210/723; 203/10; 202/200

(58) Field of Classification Search .................. 210/640, 210/175, 257.2, 195.2, 723, 738, 650; 202/200; 203/10
See application file for complete search history.

(56) References Cited

U.S. PATENT DOCUMENTS

| | | | | |
|---|---|---|---|---|
| 4,834,793 | A * | 5/1989 | Schneider et al. | 75/743 |
| 5,501,798 | A * | 3/1996 | Al-Samadi et al. | 210/652 |
| 7,371,520 | B2 * | 5/2008 | Zhao et al. | 435/6.19 |
| 7,392,848 | B1 * | 7/2008 | Bader | 166/371 |
| 7,744,761 | B2 * | 6/2010 | Constantz et al. | 210/652 |
| 7,789,159 | B1 * | 9/2010 | Bader | 166/371 |
| 2009/0152199 | A1 * | 6/2009 | Ma et al. | 210/640 |

OTHER PUBLICATIONS

Y.Wu et al. Microporous membranes in membrane distillation, 1986, Pure & Appl. Chem., vol. 58, No. 12, pp. 1657-1662.
Drioli et al. Integrating Membrane Contactors Technology and Pressure-Driven Membrane Operations for Seawater Desalination Energy, Exergy and Costs Analysis, 2006, Chemical Engineering Research and Design, 84(A3): 209-220.
Kevin W. Lawson, Membrane distillation, 2006, Journal of Membrane Science 124 (1997) 1 25.
V.D.Alves et al. Orange juice concentration by osmotic evaporation and membrane distillation: A comparative study, 2006, Journal of Food Engineering 74 (2006) 125-133.
Cassano et al. Production of concentrated kiwifruit juice by integrated membrane process, 2004, Food Research International 37 (2004) 139-148.
Cassano A. et al. Concentration of clarified kiwifruit juice by osmotic distillation, 2007, Journal of Food Engineering 79 (2007) 1397-1404.
Lagan et al. Direct contact membrane distillation: modelling and concentration experiments, 2000, Journal of Membrane Science 166 (2000) 1-11.
Bourawi et al. Application of vacuum membrane distillation for ammonia removal, 2007, Journal of Membrane Science 301 (2007) 200-209.

* cited by examiner

*Primary Examiner* — Ana Fortuna
(74) *Attorney, Agent, or Firm* — Geeta Kadambi; Riddhi IP LLC

(57) ABSTRACT

Water from underground and other sources of water are brackish and not suitable for human consumption. Naturally present dissolved chemicals in water make it brackish. The precipitants and dissolved chemicals need to be separated from water to make it consumable. A combination of aeration systems, filtration systems, crystallizers and hydrophobic membrane carrying filter are used to desalinate the brackish water. Solar energy and ceramic filters are used as add on to existing technology. Various heat exchange apparatus are used for energy conservation and efficient processing of water in a feasible way. The disclosure enables to purify water and provide a useful technology to eradicate water scarcity.

13 Claims, 13 Drawing Sheets

APPARATUS AND PROCESS FOR DESALINATION OF BRACKISH WATER

FIELD OF TECHNOLOGY

This disclosure relates generally to an apparatus, a system and method of desalinating brackish water using the apparatus and system. More particularly, to a method of using the apparatus to desalinate well water.

BACKGROUND

Water is a precious resource and one of the natural elements that needs to be conserved. Many regions in the world have scare water resources and the heavy industrial use further depletes the natural resource in developed and developing countries. In countries like Saudi Arabia it is critical to manage this resource and maximize the use.

Recent rural and urban development along with increase in population requires more good quality water not only for drinking but also for other beneficial uses. The water shortage is becoming a global issue especially in the arid and semi-arid regions of the world. According to United Nations (1999, water shortage, besides the global warming, has been considered as the most worrying problem for the new millennium). Keeping in view this scenario, the importance of brackish water desalination technology has gained momentum for the production of safe drinking water. Moreover, the conventional water desalination technologies such reverse osmosis (RO) and others suffer from many disadvantages that make these technologies rather expensive to be adopted in poor countries. The RO is a pressure driven process which is highly susceptible to fouling. In addition to that, the cost effectiveness of the RO plants is strongly dependent on the energy resources such as oil and gas prices. There is needed for alternative approaches over the conventional desalination technologies.

SUMMARY

The disclosure describes an apparatus, a system and a process of desalinating brackish water to restore and/or maintain the basic life-sustaining natural elements, i.e., water. More particularly an apparatus, process and system for desalinating brackish water using different configuration of the apparatus are described.

In one embodiment, desalination of brackish water using novel aeration system is described. In another embodiment, a filtration system is described. The filtration system may be used in combination with the aeration system. In another embodiment, dissolved chemical that are present in the water are precipitated to make an adsorbent. In one embodiment, the heat contained in the well water is used in the heat exchanger to recycle the existing heat.

In one embodiment, multiple units in parallel comprising of hydrophobic membranes are used as membrane distillation system. The membrane distillation system may be used with a vacuum pump. The vacuum may be used on one side of the unit containing the membrane to have effective separation of the water vapor. The water vapor is collected in one embodiment as distillate water for human consumption.

The retentate stream of water, in another embodiment, is sent to the crystallizer to collect the contaminants as adsorbents. The adsorbents may be used for filtering water in another embodiment. The retentate stream of water is also passed through a heat exchanger to harvest the existing heat for recirculation.

In one embodiment, suction fan is used to collect water vapor from aeration system and filtration system and passed on to the heat exchanger to use the latent heat.

In one embodiment, well water is passed through the multi unit in parallel membrane distillation system. Well water feed that is hot comes in contact with the hydrophobic membrane. Vacuum is applied on the permeate side of the membrane and the water vapor is collected. The water vapor is condensed and collected as a distillate. Some amount of crystallizer product may be added to the distillate water to balance the content requirement for nutritional as well as taste balance purpose.

In one embodiment, the distillate water is tested for acceptable level of heavy metal contaminant and may be sent back to the membrane distillation system for a second iteration for removal of dissolved contaminants if the levels are below local authority authorized level.

The systems and processes disclosed herein may be implemented in any means for achieving various aspects, and may be executed manually or automated using a computer. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIG. 13 shows the schematic diagram of MDC-VMD system 1200 by not recirculating via aeration system 200.

Other features of the present embodiments will be apparent from the accompanying drawings and from the detailed description that follows.

DETAILED DESCRIPTION

In the instant disclosure several processes and system for desalinating water and brackish water are disclosed. Although the present embodiments have been described with reference to specific example embodiments, it will be evident that various modifications and changes may be made to these embodiments without departing from the broader spirit and scope of the various embodiments.

The instant application discloses the process and a system that materially enhances the quality of the environment of mankind by contributing to the restoration or maintenance of the basic life-sustaining natural elements, i.e., water. The instant disclosure illustrates with example after removal of heavy metal and salt from water and brackish water may be used as drinking water, hence helping in restoration and reuse of natural resource such as water. Removing the precipitants as described in the instant disclosure helps recycle the unusable water and materially enhance the quality of the environment by contributing to the restoration of one of the basic life-sustaining natural elements, e.g., water.

Figure 1:
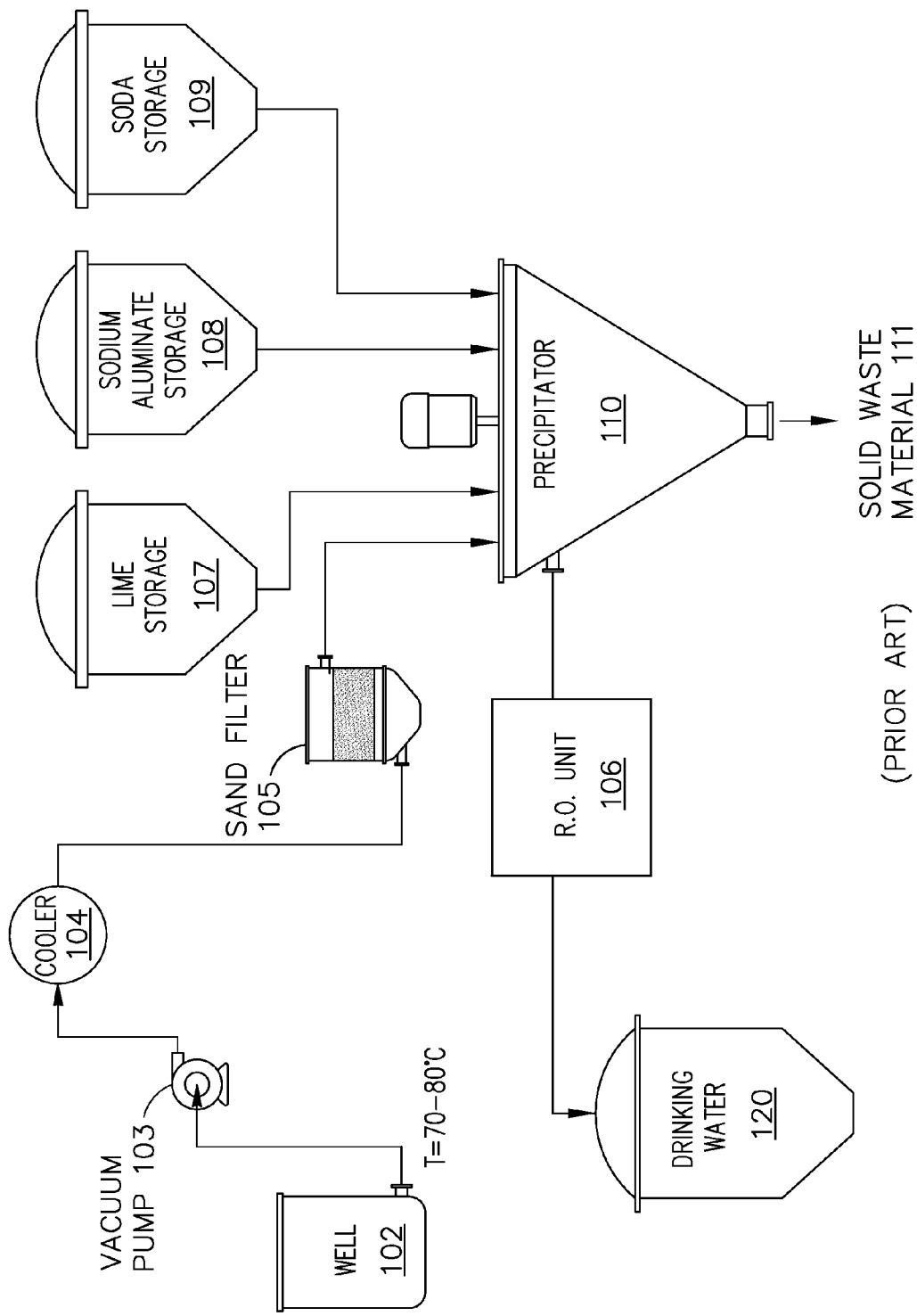
FIG. 1 is a flow diagram of the prior art of performing reverse osmosis.

The following disclosure illustrates several embodiments in detail. A relatively inexpensive, low energy consumption, but highly effective desalination procedure for removal of heavy metal contaminants and dissolved salts from water and brackish water is needed. FIG. 1 shows a production of drinkable water using an expensive reverse osmosis process. Reverse osmosis (RO) is a filtration method that removes many types of large molecules and ions from solutions by applying pressure to the solution when it is on one side of a selective membrane. The resultant solute is retained on the pressurized side of the membrane and the pure solvent is allowed to pass to the other side. To be "selective", this membrane should not allow large molecules or ions through the pores (holes), but should allow smaller components of the solution (such as the solvent) to pass freely. Reverse osmosis is most commonly known for its use for the production of drinking water from seawater desalination by removing the salts and other substances from the water molecules. The reverse osmosis process is effective but very time consuming, expensive and laborious. The operating pressure for reverse osmosis is between 40-60 bar and the pore size of either cellulose acetate or polysulfone coated with aromatic polyamides are <0.002 μm.

The instant description enables the user to use various combinations of aeration system, filtration system, vacuum pumps, suction pump, membrane based distillation system, coolers, heat exchangers, solar energy, ultra high concentrator photovoltaic cell (UHCPV) and crystallizer to desalinate brackish and/or unusable water and provide drinking water and/or usable water for human consumption. Various examples and their benefits in producing desalinated water through low cost high efficiency using various combinations of configuration of systems are described as examples below. The instant description specifically concentrates on the aeration system, filtration system and membrane distillation-crystallization system to produce desalinated drinkable water.

Figure 2:
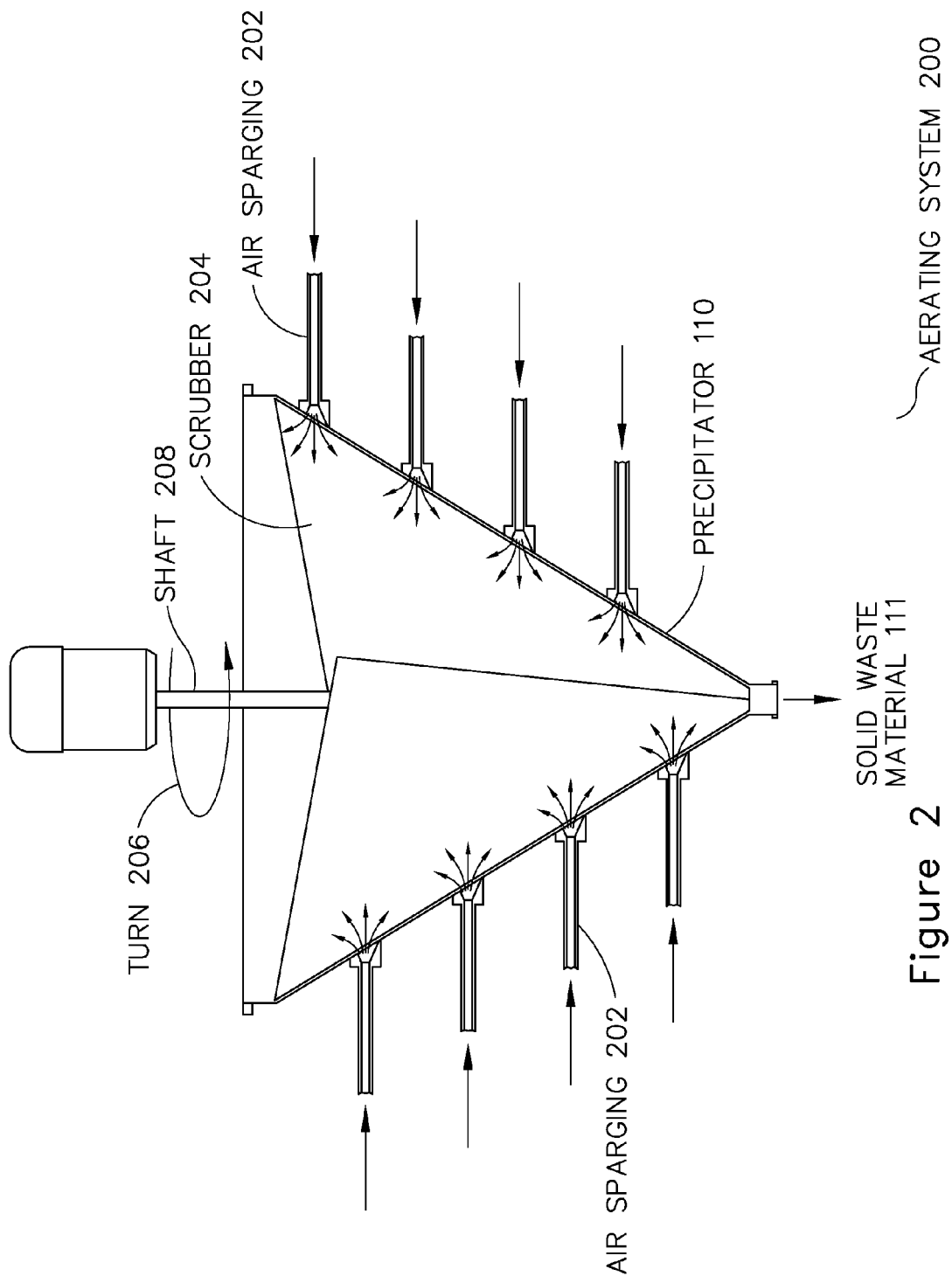
FIG. 2 shows an aeration system 200.

FIG. 2 shows an aeration system 200. Aeration system includes conical vessel precipitator 110 with smooth internal surface and scrubber 204. This aeration system will be used as a pretreatment before membrane distillation (MD) system stage to reduce and minimize the fouling in the MD system. Generally, the deep well waters contain various types dissolved chemicals such as salts and salt ions such as iron (Fe), manganese (Mn), calcium (Ca) and magnesium (Mg) salts including other solids such as the silica from aquifer rocks as waste. The temperature of the well water is between 70-80° C. at the depth of 2500 meters. The hot well water is pumped into an aeration unit which results in the precipitation of Ferrous/Ferric oxide. Also, the salts causing hardness will be deposited in aeration tank due to the high temperature of the well water. Brackish waters are usually regarded as those containing 0.5 to 30 parts per thousand salt, while the average saltiness of seawater is 35 parts per thousand.

One of the primary dissolved chemical as waste in well water may be in the form of salt. For example, well water has calcium bicarbonate and calcium sulfates as dissolved chemicals. Calcium bicarbonate changes to calcium carbonate at temperature above 50° C. which precipitates while carbon dioxide is liberated and the calcium carbonate forms a waste 250. This may be considered as a first precipitant.

Calcium carbonate is known as alkaline waste. The following reactions occur upon cooling the well water:

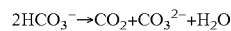

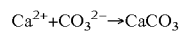

The other important type of precipitant in well water is the calcium sulfate. There are three formulae of calcium sulfate which is present in water. For e.g.: Anhydrite $CaSO_4$, hemihydrate $CaSO_4.\frac{1}{2}H_2O$ and dihydrate $CaSO_4.2H_2O$ (gypsum). The anhydrite may form a precipitate above 40° C. due to its lower solubility.

Another precipitant such as manganese is oxidized and converted to deposit on the cooling towers as a solid waste 111. This may be considered as a second precipitant.

These dissolved chemicals in well water that may be brackish water as a waste can be precipitated from water to be used as adsorbent. This solid waste can be removed by operating the scrubber in certain time intervals and use the removable solid as a new adsorbent to adsorb heavy metals from well water.

Figure 3:
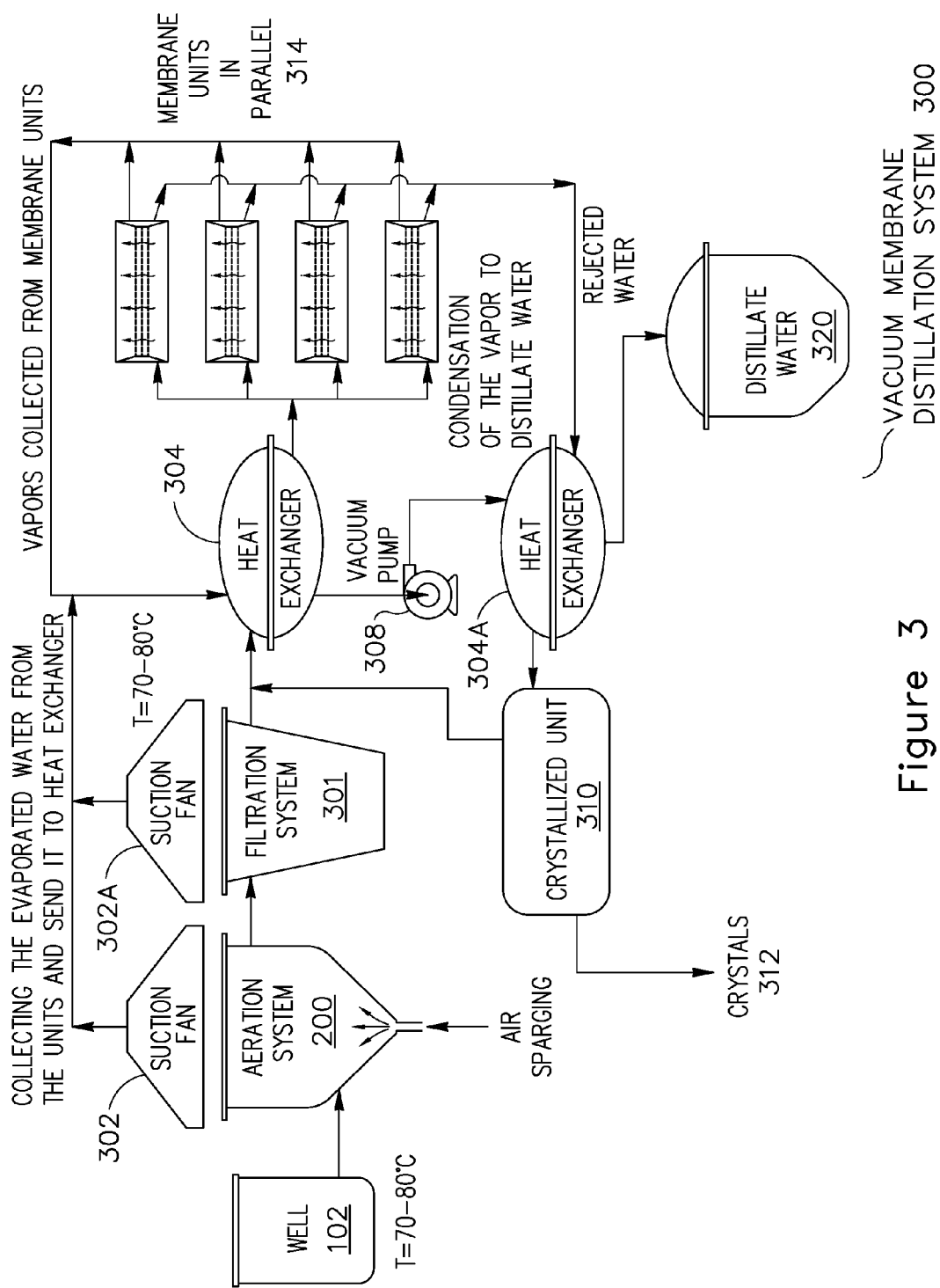
FIG. 3 shows a schematic view of the method of vacuum membrane distillation system 300.

FIG. 3 shows a vacuum membrane distillation (VMD) system 300. This system is a combination of various systems to produce desalinated distillate water 320 for human consumption. Well water 102 (brackish water as well) is pumped into an aeration system to remove contaminants (precipitating and dissolving) and precipitants. Since the well water is hot some water vapor is collected using suction fan 302 to send it to heat exchanger 304. Salts that cause hardness to the well water are precipitated by using air sparging in the aeration system.

Subsequently, well water is passed to filtration unit 301 to remove any suspended materials. In aeration stage and filtration stage, any water that evaporated will be collected by using suction fan (302-302A etc) and the vapor is further transported to the heat recovery system (heat exchanger 304). The water is passed through the aeration system (e.g. brackish water) and filtration system (e.g. secondary brackish water) to reduce membrane fouling as well. Otherwise the organic substances etc promote microorganism and bacterial growth and cause biofouling of the membrane. The heat exchanger transfers the heat to the feed stream for the membrane distillation system comprising of several membrane units in parallel (314) and the water vapor may be condensed to distillate water 320 and collected in distillate water tank to be distributed for human consumption.

Through the heat exchanger 304 the water is sent to membrane distillation system. The membrane distillation (MD) system is made up of several membrane units that are used in parallel 314. Each MD system contains a hydrophobic membrane (PVDF) to separate water and dissolved minerals. The membrane distillation process includes micro-porous hydrophobic hollow fiber membrane modules. Therefore, the operating pressure will be equal to the natural atmospheric pressure (equal to 1-bar). PVDF membrane is chosen in this study for membrane preparation because it is a commercially available hydrophobic polymer.

The water feed to the MD system is hot (70-80° C.) and is brought into contact on one side of the hydrophobic membrane. The vacuum is applied through a vacuum pump 308 through the membrane permeate side. Hydrophobic nature of the functional membrane prevents the liquid water streams stay outside the membrane while water vapors will penetrate from the feed side. The pressure gradient such as a higher partial pressure than the permeate side with a lower partial pressure also enhances the separation. This enables distillate water will be collected in the permeate side in a continuous manner. Another heat exchanger 304 A is used between the MD system and crystallizer unit 310. The second heat exchanger may be used to harness the heat from the retenate stream of water to heat the feed stream from the filtration system or the aeration system. After the water has passed the MD system and has not passed through the membrane as a vapor would become a retentate stream which contains concentrated solutes in it. In order to crystallize them and use them as adsorbents in the form of crystals the retenate stream is passed through a crystallizer unit. The water vapor is passed to the heat recovery system to transfer the heat to the feed of MD unit and the water vapor will be condensed to water form and collect in distillate water tank. This particular embodiment is a vacuum membrane distillation system 300. Another embodiment may be the combination of membrane distillation-crystallizer system (MDC). Membrane distillation (MD) and a crystallizer in which pure water is produced as permeate from the MD process while the concentrated solutes can be recovered as solids from the crystallizer. This illustrates how various systems may be combined to produce desalinated water as an integrated system of comprising of aeration system, filtration system, a regular filter, a ceramic filter, a heat exchanger, vacuum pump, a vacuum membrane distillation system, a membrane distillation system, a direct contact membrane distillation and a membrane distillation bioreactor. This is by no means limited or restrictive. Subsequent examples illustrate various other components added to the desalination system to make it cost effective and energy efficient.

The operating temperatures in this new innovative process can be maintained as low as 50° C. and the operating pressure will be equal to the natural atmospheric pressure (equal to 1-bar). This will make this process high energy efficient and cost effective, especially when combined with low grade energy sources (the energy source for this process is a natural energy source from the deep well water, where the water temperature of the deep wells, up to 2500 m depth, ranges between 70-80° C.).

The very low operating pressure allows thinner piping and fewer maintenance problems. Also, the capital and maintenance expenses for MD will be lower in comparison to pressure-driven membrane separation processes like RO. The integrated MD systems will be a potential alternative to RO water desalination because the thermal energy is naturally available from the deep wells.

Figure 4:
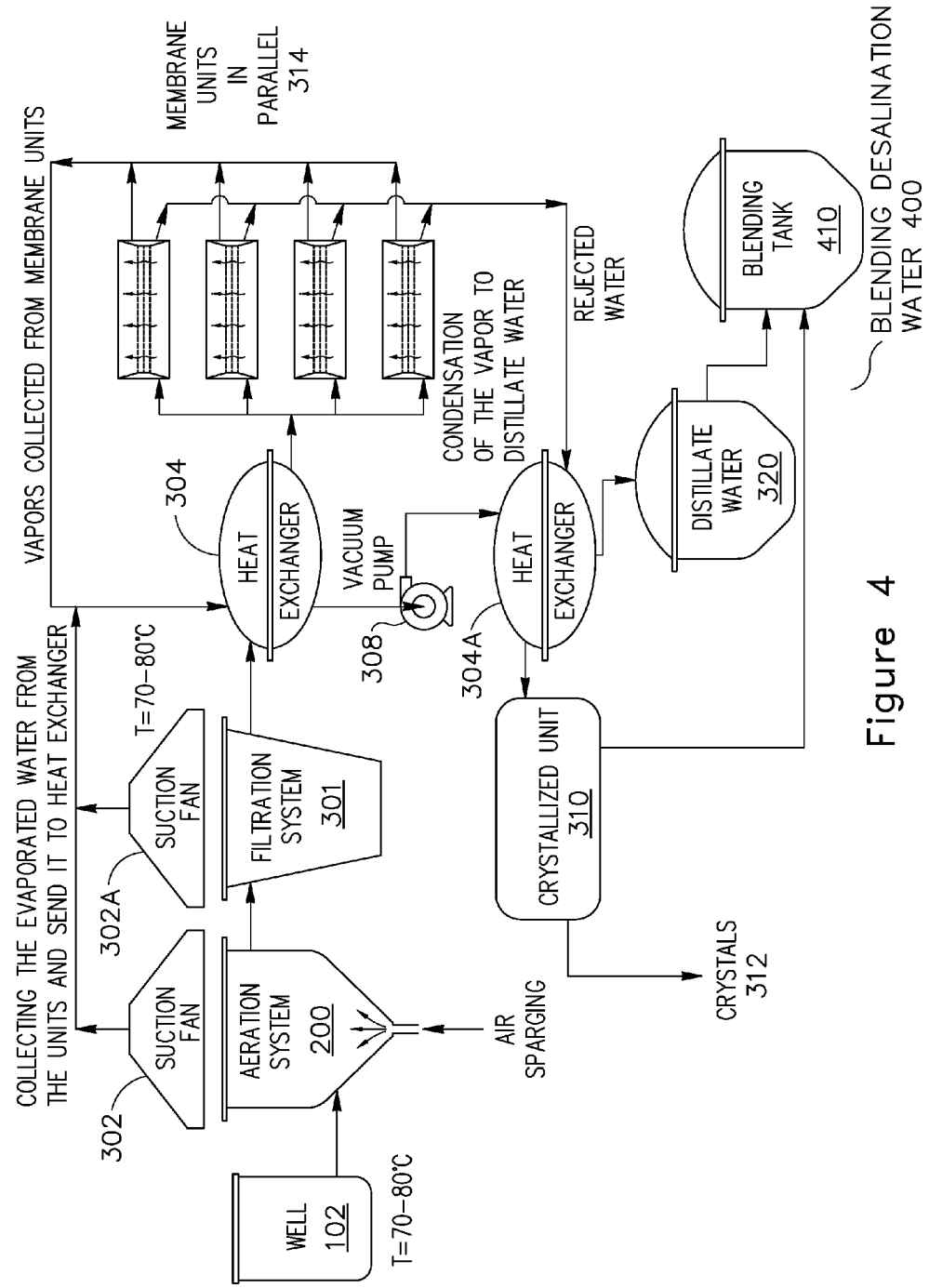
FIG. 4 shows a schematic view of the method of blending desalinated water 400 to make it drinkable.

FIG. 4 shows similar process flow as FIG. 3 with one difference. A concentrated MD retentate stream will be returned to the crystallizer and the water from the crystallizer will be mixed with the distillate water in blending tank 410 to balance the water concentration to be ready for drinking. This process allows the water to be customized for nutritional requirements for the local population and makes it more palatable.

Figure 5:
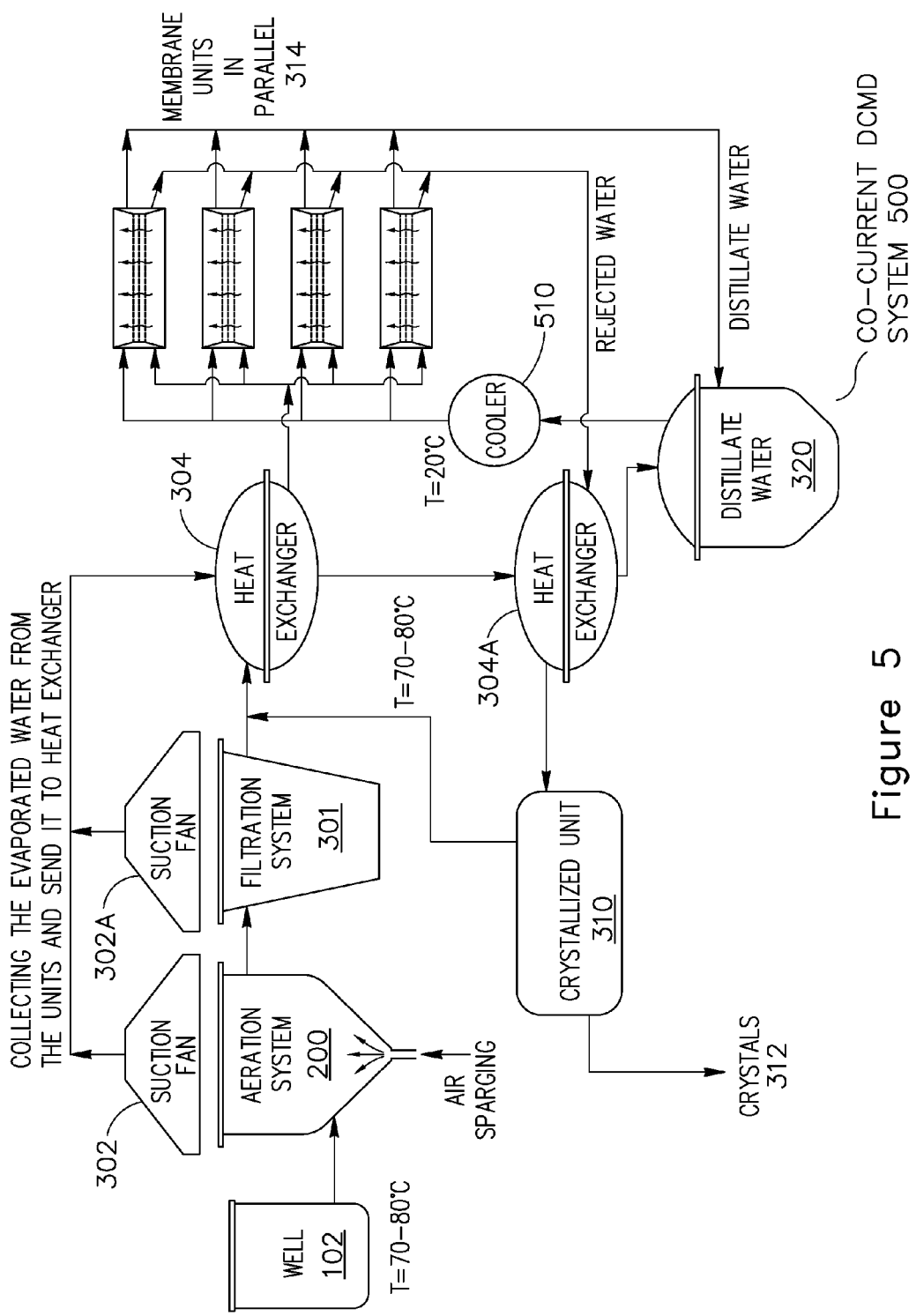
FIG. 5 shows a schematic view of co-current DCMD system 500.

FIG. 5 shows a co-current direct contact membrane distillation (DCMD) system 500. The most of the system is similar to FIGS. 3 and 4. Some variations are described below. In this system, the liquid feed is hot (70-80° C.) and is brought into contact with one side of the hydrophobic membrane. On the membrane permeate side; a cold stream of pure water (suggested at room temperature 25° C.) is in direct contact with the permeate side of the membrane to maintain the mass transfer driving force, which is the water vapor partial pressure across the membrane. This configuration is known as the DCMD system. In this system, distillate water will be circulated as co-current in the permeate side in a continuous manner with fixed temperature at 25° C.

Figure 6:
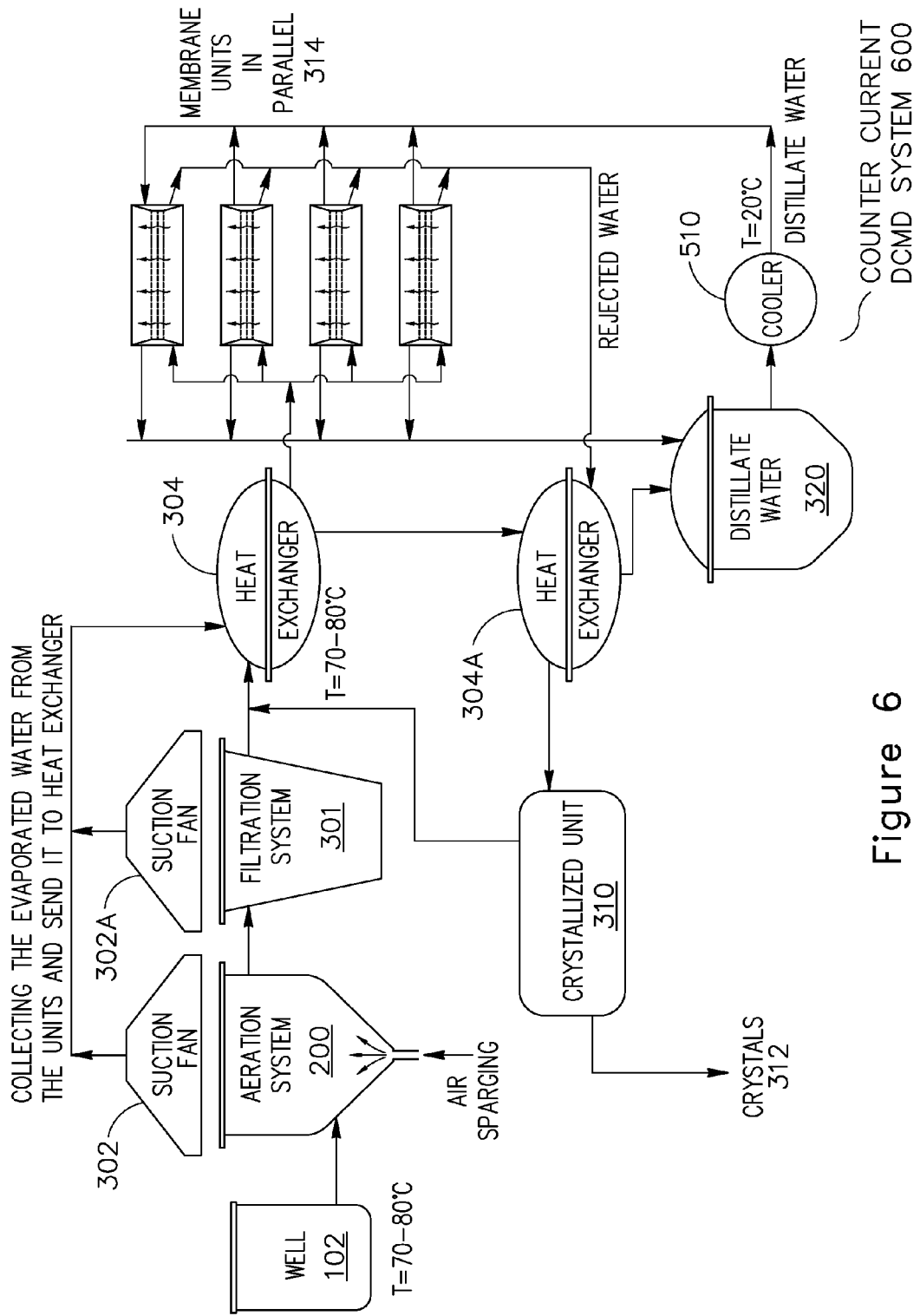
FIG. 6 shows a schematic view of counter current DCMD system 600.

FIG. 6 shows a system having a counter current DCMD system. The difference between FIGS. 5 and 6 is the MD flow is in counter-current way between the hot feed water and the permeate water. This increases the efficiency of the flux rates.

Figure 7:
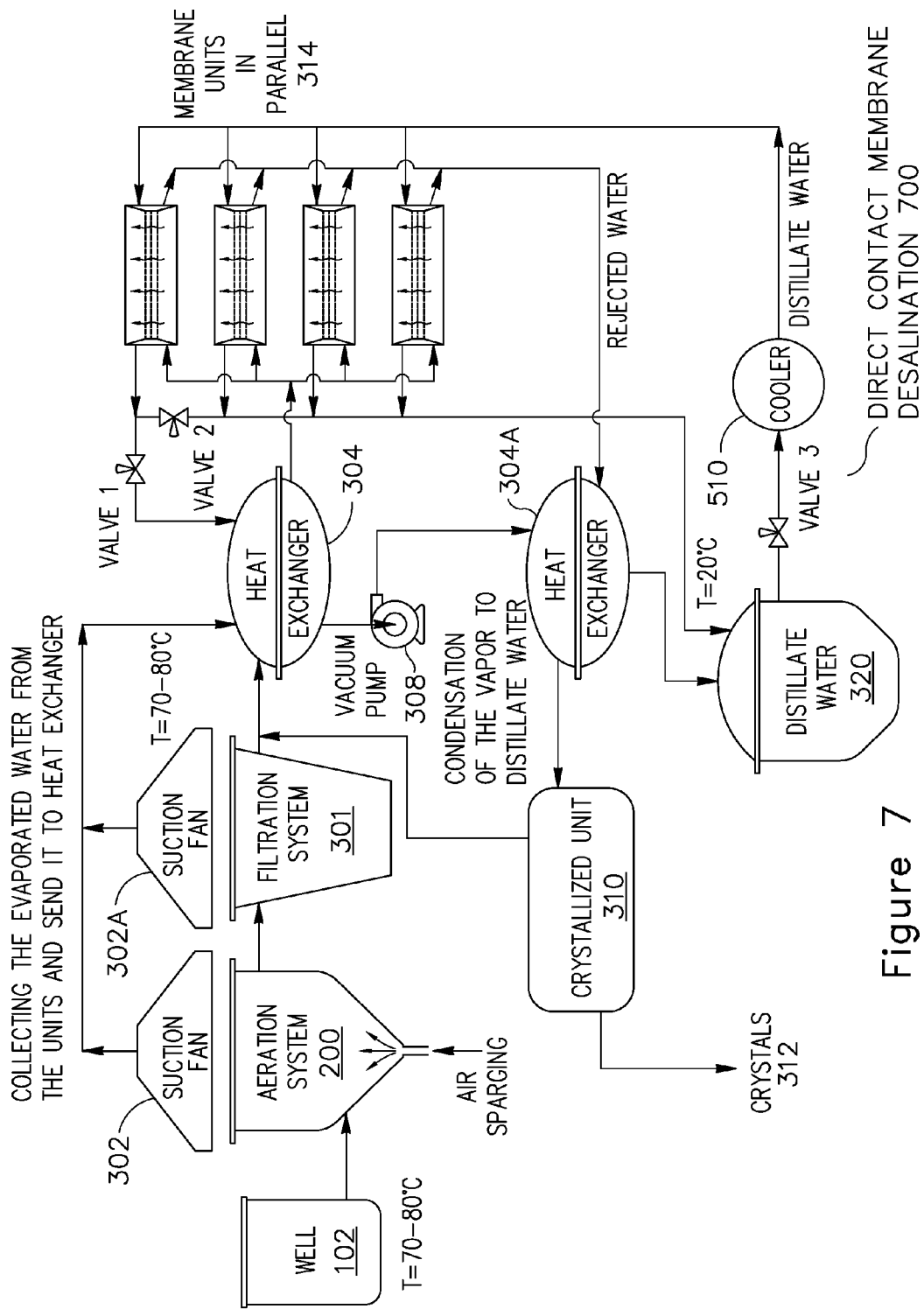
FIG. 7 shows a schematic flow direct contact membrane distillation 700.

FIG. 7 shows yet another novel desalination system that is combination of VMD and DCMD 700. This is an example to optimize and increase the efficiency of the system. It is very similar as shown in above examples and differs in the following way. In an VMD process, vacuum is applied in the permeate side of the membrane module by means of a vacuum pump. In this case, condensation occurs outside of the membrane module by using energy recovery system (e.g. heat exchanger). This MD configuration is termed vacuum membrane distillation (VMD) by open valve 1 and closed valves 2 and 3.

In an MD process, a porous hydrophobic membrane (PVDF) is suggested to utilize to perform the separation among water and dissolved minerals. In this process, the water feed is hot (70-80° C.) and is brought into contact with one side of the hydrophobic membrane. On the membrane permeate side; vacuum is applied by means of a vacuum pump. The vapor is passed to the heat recovery system (e.g. heat exchanger) to transfer the heat to the feed of MD unit and the water vapor may be condensed to water form and collected in distillate water tank. After that, one may switch the MD system to operate as DCMD process by closing valve 1 and opening valves 2 and 3.

Figure 8:
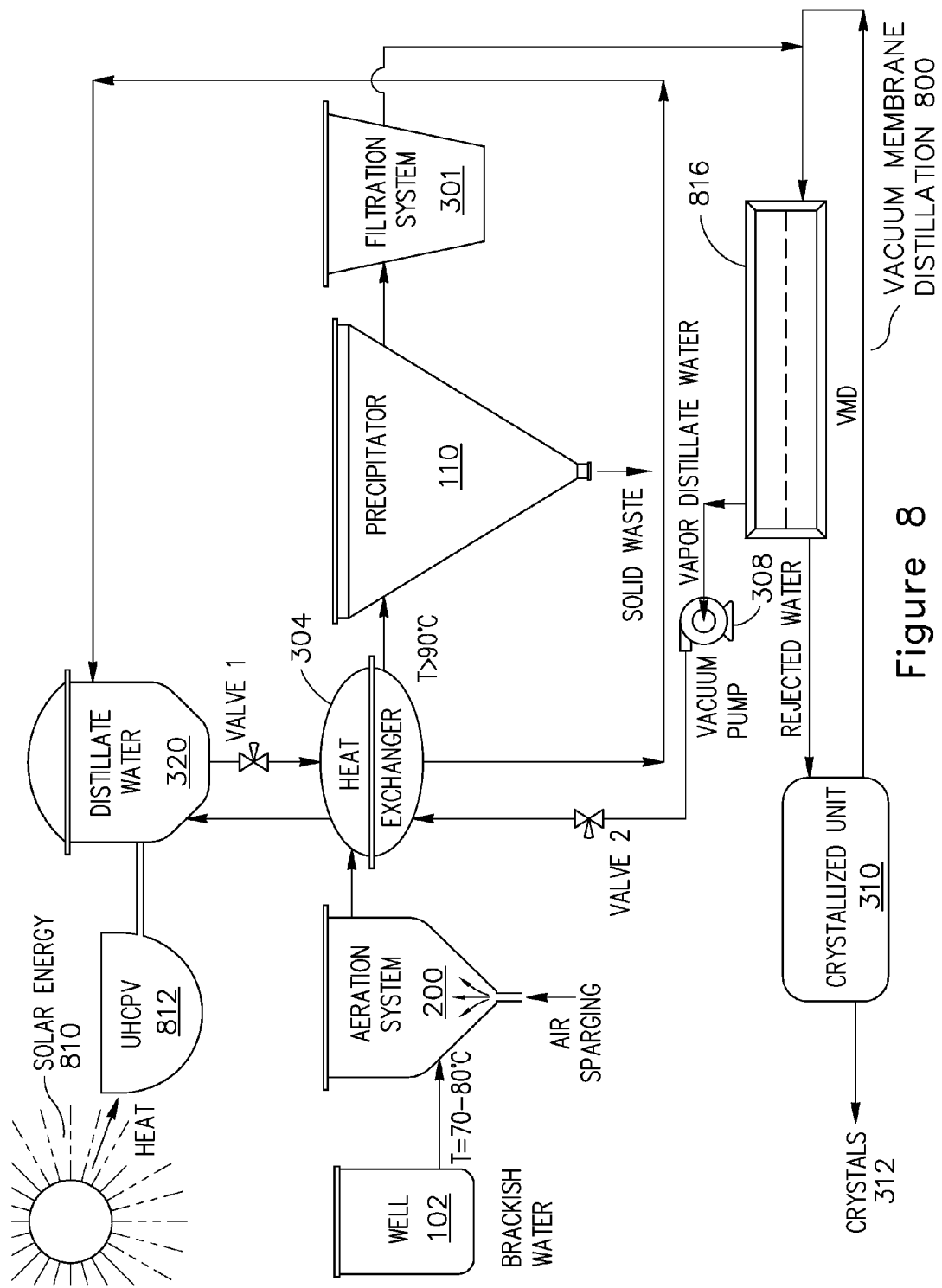
FIG. 8 shows the flow chart of vacuum membrane distillation 800.

FIG. 8 shows a process and apparatus being used for vacuum membrane distillation system 800 by using solar energy and ultra high concentrator photovoltaic (UHCPV). The hot water (70-80° C.) is pumped from the deep well to the aeration unit including air sparging to precipitate most of the salts causing hardness and, to precipitate iron oxides and manganese oxides by using heat treatment and aeration process. Then, water is passed to precipitation unit after increasing the raw water temperature up to 90° C. to precipitate the rest of salts causing hardness which precipitate at 90° C. It will take place by increasing the raw water temperature to more than 90° C. by adding heat from solar energy using ultra high concentrator photovoltaic (UHCPV) in the beginning. In order to increase the raw water temperature up to 90° C., solar energy will be used as a natural source of energy to increase the raw water temperature by 10° C. to reach 90° C. This process has a circulation system where distillate water is heated to provide enough energy to increase the raw water by 10° C. which is accomplished by using heat exchanger to complete the heat transfer from the distilled water to feed raw water. After that, the distilled water will go back to the distillate water tank. It is important to mention that the use of solar energy will be just in the beginning until the water comes back as a vapor from the vacuum membrane distillation (VMD) units and the heat from this water vapor are transferred by using the heat exchanger to increase the raw water temperature by open valve 2 and close valve 1. This process will be a continuous process and there will be no need to use solar energy any more to increase the raw water temperature.

Another advantage of this process is that the precipitated solids (a waste) can be used as an adsorbent to remove heavy metals from waste water. Then, water is passed to filtration unit to remove any suspended materials. After filtration stage, water is passed to membrane distillation-crystallizer system (MDC). In membrane distillation (MD), vacuum is applied in the permeate side of the membrane module by means of a vacuum pump. In this case, condensation occurs outside of the membrane module unit by using energy recovery system (e.g. heat exchanger). Where, the water vapor from VMD may go to the heat exchanger by open valve 2 and the heat from this vapor may be transferred to the feed raw water to increase the raw water temperature to more than 90° C. and this vapor will condense after passing the heat exchanger and collect in the distillate water tank. Therefore, the solar energy is no longer required to increase the raw water (feed water) temperature any more as it will be a continuous process. This MD configuration is termed vacuum membrane distillation (VMD).

In an MD process, a porous hydrophobic membrane (PVDF) is suggested to utilize to perform the separation among water and dissolved minerals. In this process, the water feed is hot (90° C.) and is brought into contact with one side of the hydrophobic membrane. On the membrane permeate side; vacuum is applied in the permeate side of the membrane module by means of a vacuum pump. The vapor from the permeate side of the VMD is passed to the heat recovery system (e.g. heat exchanger) to transfer the heat to the feed of the raw water to increase the feed temperature of the raw water more than 90° C. and by transfer the heat to the feed raw water the water vapor will be condensed to water form and collect in distillate water tank.

Figure 9:
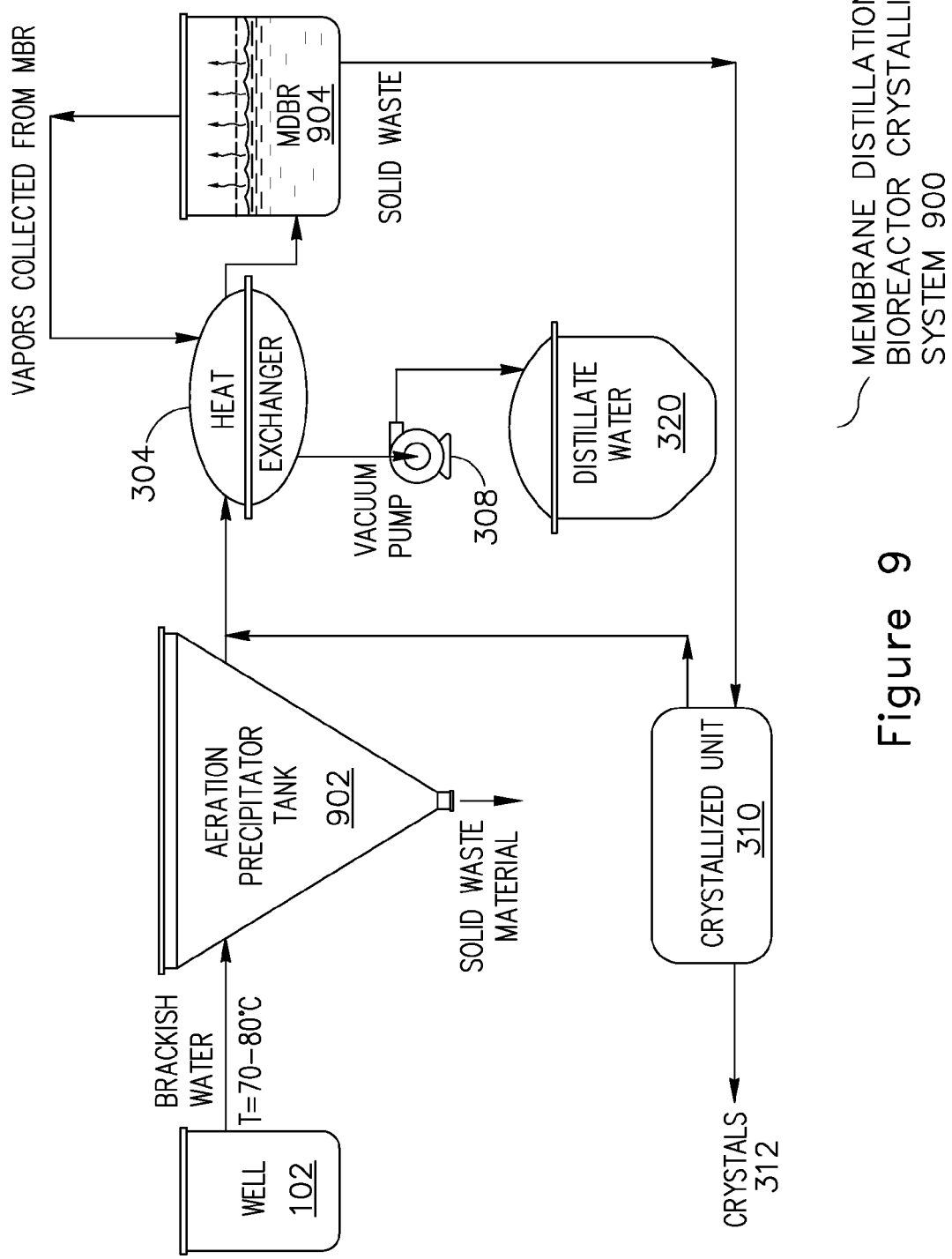
FIG. 9 shows the schematic diagram of using membrane distillation bioreactor crystallization system 900.

FIG. 9 shows an apparatus and process of membrane distillation bioreactor crystallization system 900. In this system, the hot water (70-80° C.) is pumped from the deep well to the aeration unit including air sparging to precipitate most of the salts causing hardness and, to precipitate iron oxides and manganese oxides by using heat treatment and aeration process as explained in section "aeration system to reduce membrane fouling". Subsequently, water is passed to membrane distillation bio-reactor (MDBR). The MDBR is a combination of the membrane distillation process and the biological treatment process in which the membrane distillation module is submerged in a bioreactor. Water is removed from the bioreactor by a thermally driven process across the hydrophobic membrane in the MD module.

In membrane distillation (MD), vacuum is applied in the permeate side of the membrane module by means of a vacuum pump. In this case, condensation occurs outside of the membrane module by using energy recovery system (heat exchanger). This MD configuration is termed vacuum membrane distillation (VMD). In an MD process, a porous hydrophobic membrane (PVDF) is suggested to utilize to perform the separation among water and dissolved minerals. In this process, the water feed is hot (70-80° C.) and is brought into contact with one side of the hydrophobic membrane. On the membrane permeate side; vacuum is applied in the permeate side of the membrane module by means of a vacuum pump. The vapor is passed to the heat recovery system (heat exchanger) to transfer the heat to the feed of MD unit. The water vapor may be condensed to water form and collect in distillate water tank.

On the membrane permeate side, vacuum will be applied in the membrane permeate side. Because of the hydrophobic nature of the functional membrane, liquid water streams will be kept outside the membrane while water vapors will penetrate from the feed side with a higher partial pressure to the permeate side with a lower partial pressure. In this way, fresh water will be collected in the permeate side in a continuous manner.

A significant point is that the salts are retained by the MD and will accumulate in MDBR unit until discharged with the solid waste. Therefore, membrane distillation bioreactor crystallization system is combined to remove the salts as crystals, where the MDBR circuit is coupled with a crystallizer. A concentrated MDBR retentate stream will be returned to the crystallizer and the water from the crystallizer recirculated as the MDBR feed stream. MDBRC is a combination of membrane distillation bioreactor (MDBR) and a crystallizer in which pure water is produced as permeate from the MDBR process while the concentrated solutes can be recovered as solids from the crystallizer. In MD only water vapor, is transferred across the membrane. Therefore, MD can provide effectively complete retentions of non-volatile organics, salts, and microorganisms. In addition, the permeate quality is independent of the biological activity of the bioreactor because the water vapor moves across the hydrophobic membrane.

Figure 10:
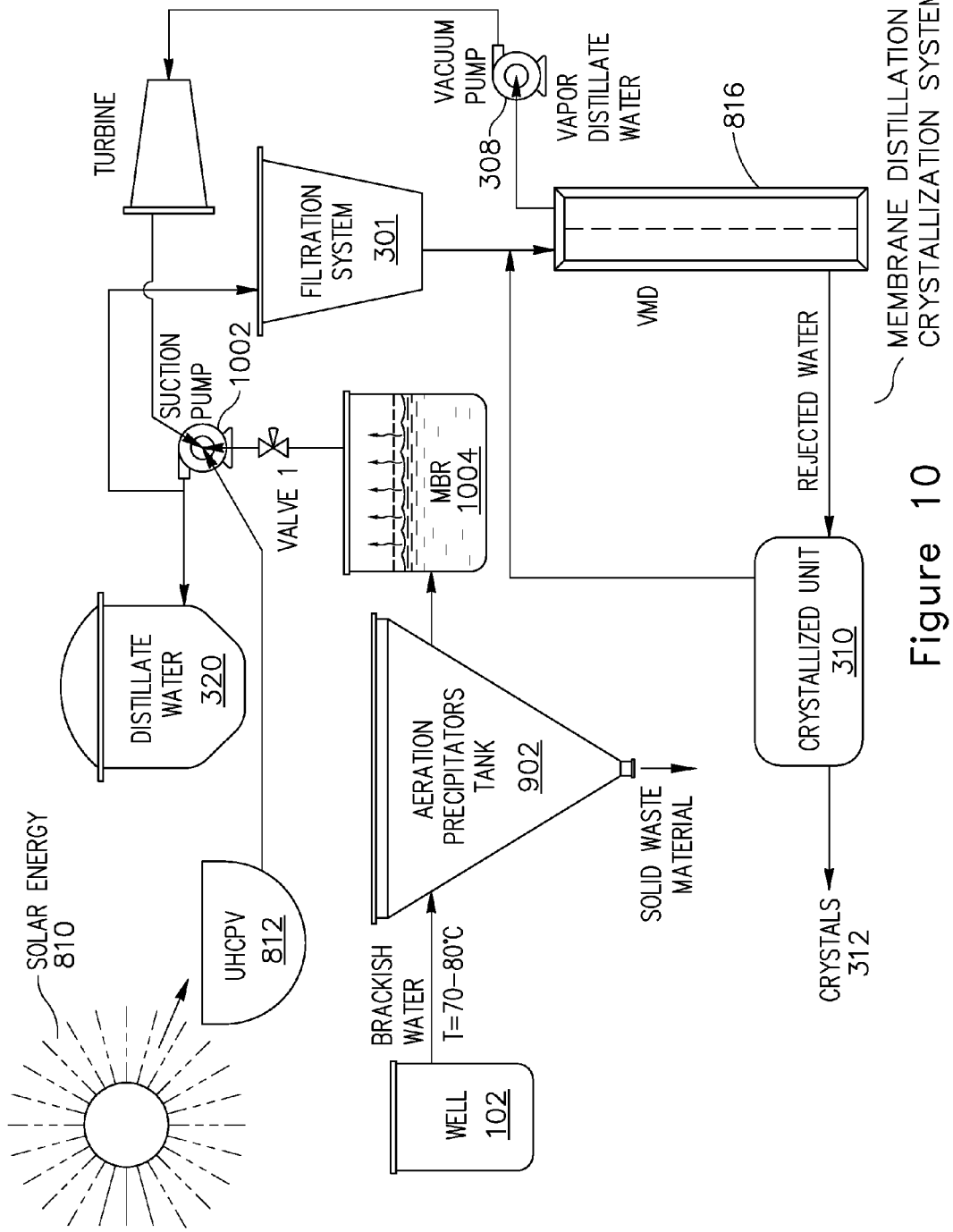
FIG. 10 shows the schematic diagram of using membrane distillation crystallization system.

In this example as shown in FIG. 10 as membrane distillation crystallization system 1000, the hot water (70-80° C.) is pumped from the deep well to the aeration unit including air sparging to precipitate most of the salts causing hardness and, to precipitate iron oxides and manganese oxides by using heat treatment and aeration process as explained in section "aeration system to reduce membrane fouling". Subsequently, water is passed to membrane bio-reactor (MBR) to control bio-fouling as explained before. The suction pump that use for MBR is need to source of energy to run. Therefore, this pump can be worked by adding electricity from natural source such as solar energy using ultra high concentrator photovoltaic (UHCPV) in the beginning.

It is important to mention that the use of solar energy will be just in the beginning until the water comes back as a vapor from the vacuum membrane distillation (VMD) units and go to the turbine to generate electricity to operate the suction pump of MBR. Therefore, the solar energy is no longer required to generate electricity for the suction pump of the MBR any more as it will be a continuous process. Then, water is passed to filtration unit to remove any suspended materials. After filtration stage, water is passed to membrane distillation crystallizer system (MDC). In membrane distillation (MD), vacuum is applied in the permeate side of the membrane module by means of a vacuum pump. In this case, condensation occurs outside of the membrane module by using turbine (the vapor will be used to run the turbine to generate electricity for the suction pump of the MBR). Where, the water vapor from VMD will go to the turbine to generate electricity for the suction pump of the MBR and this the water vapor will be condensed to water form after passing the turbine and collect in distillate water tank.

Hence, the solar energy is no longer required to generate electricity for the suction pump of the MBR any more as it will be a continuous process. This MD configuration is termed vacuum membrane distillation (VMD).

In an MD process, a porous hydrophobic membrane (PVDF) is suggested to utilize to perform the separation among water and dissolved minerals. In this process, the liquid feed is hot (70-80° C.) and is brought into contact with one side of the hydrophobic membrane. On the membrane permeate side; vacuum is applied in the permeate side of the membrane module by means of a vacuum pump. The vapor is passed to the turbine to generate electricity for the suction pump of the MBR and after that, this the water vapor will be condensed to water form after passing the turbine and collect in distillate water tank. Rest if the process us similar to previous example.

Figure 11:
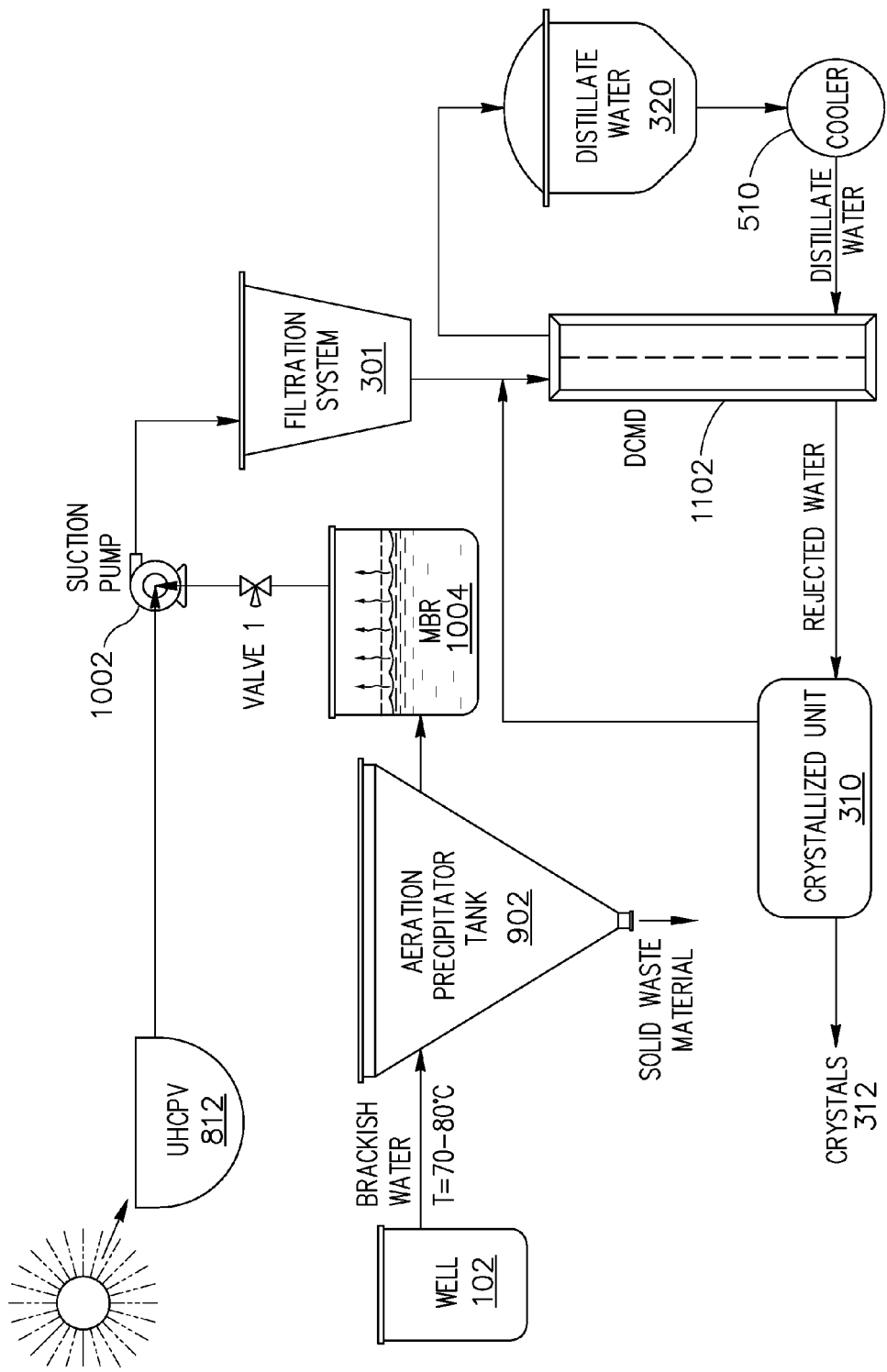
FIG. 11 shows the schematic diagram of using membrane bioreactor (MBR)-DCMD system 1100.

FIG. 11 shows an apparatus and process flow of MBR-DCMD system 1100. It is similar to FIG. 10 and the difference is distillate water will be circulated in counter-current, to make the system is more efficient, in the permeate side in a continuous manner with fixed the temperature at 25° C.

Figure 12:
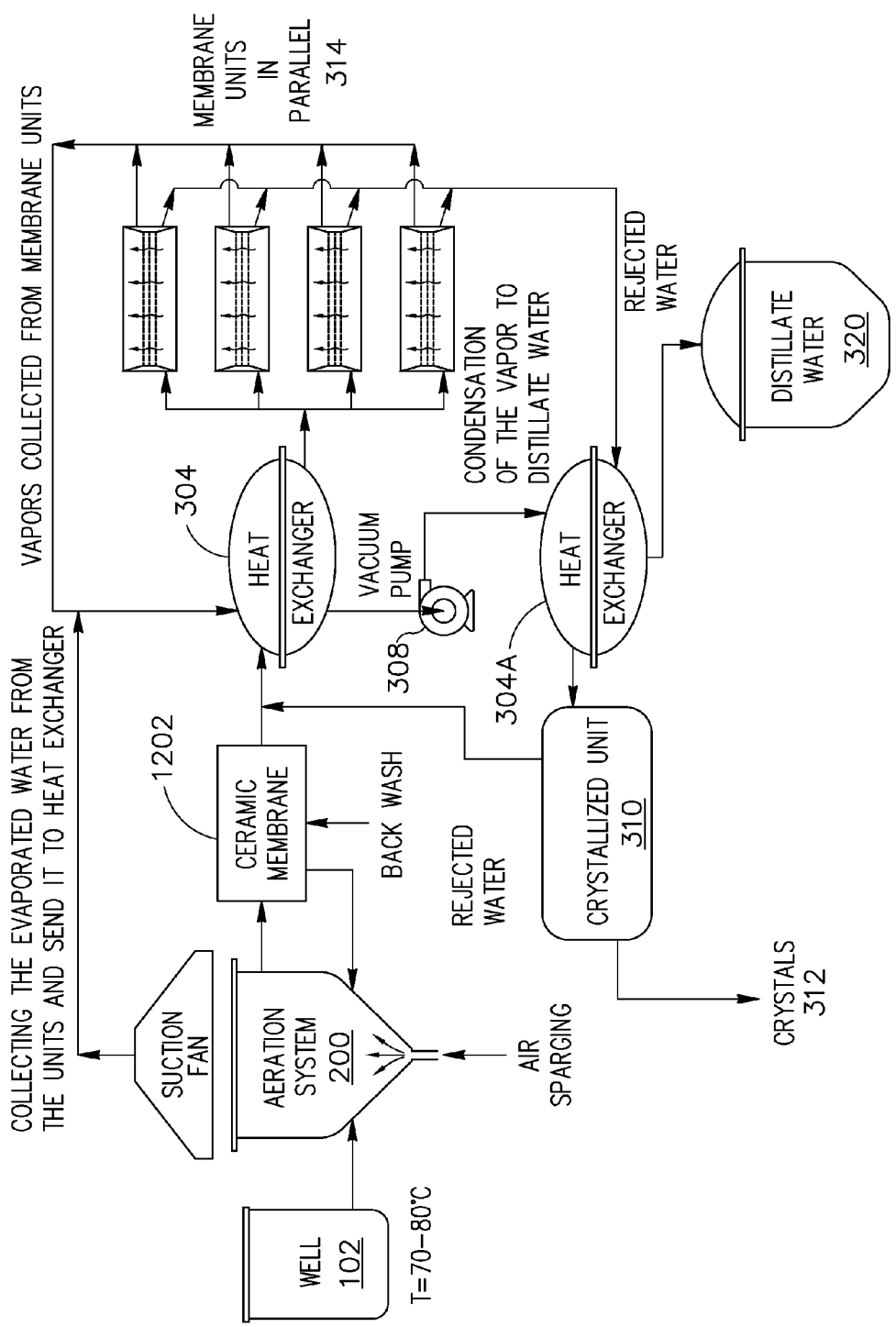
FIG. 12 shows the schematic diagram of MDC-VMD system 1200.
Figure 11:
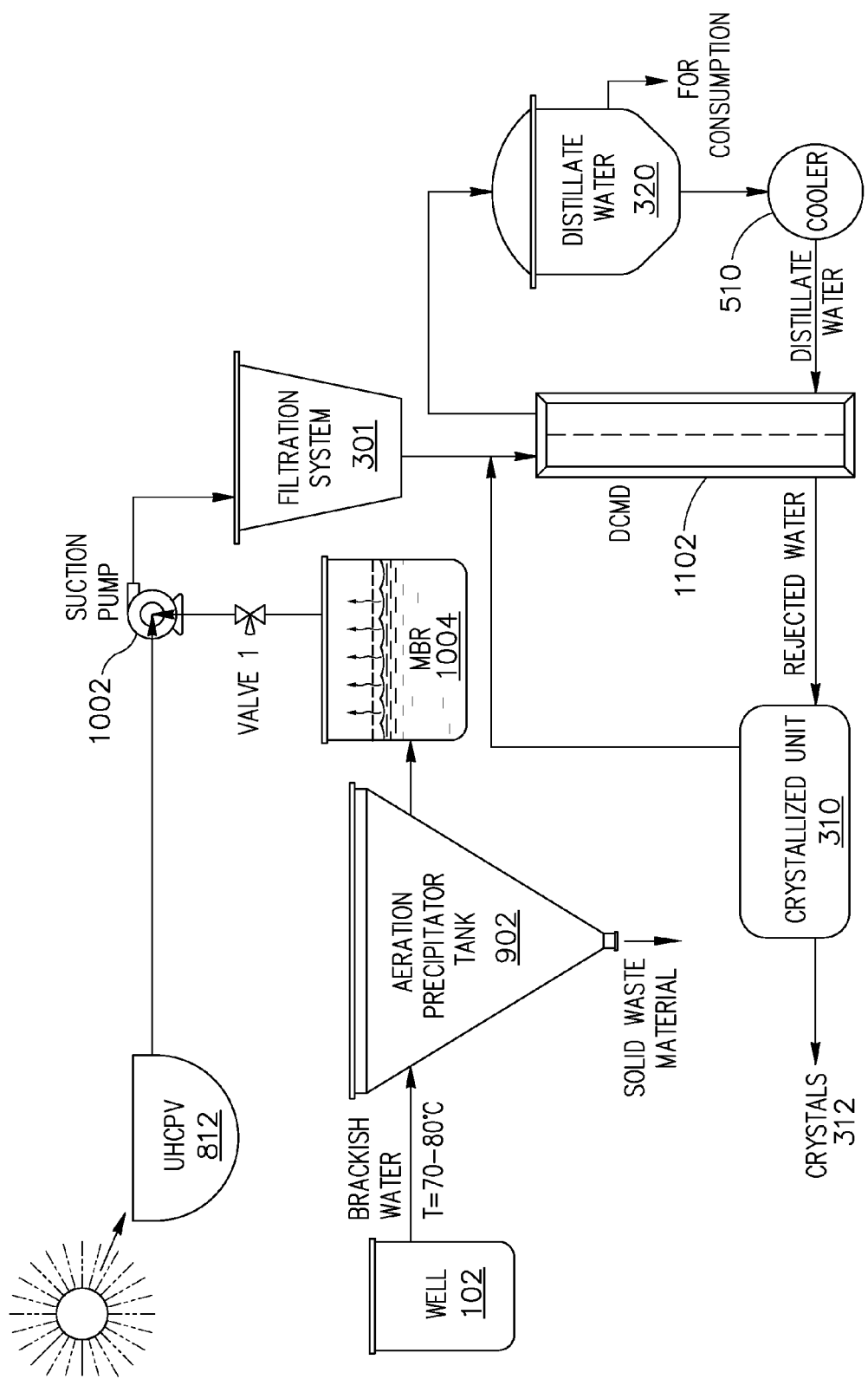

In FIG. 12, MDC-VMD system 1200 includes ceramic membrane. In this example, the hot water (70-80° C.) is pumped from the deep well to the aeration unit including air sparging to precipitate most of the salts causing hardness, to precipitate iron oxides and manganese oxides by using heat treatment and aeration process as explained in section "aeration system to reduce membrane fouling". Then, water is passed to ceramic membrane (nano-size) to control TOC and to remove the salts causing hardness.

It is important to mention that the use of backwash for ceramic membrane at certain interval time will help to clean the ceramic membrane regularly. In addition, ceramic membrane can be prepared and synthesis from low cost local material. The concentrated (rejected) water from ceramic membrane will be returned to the aeration unit. After that, purified water from ceramic membrane is passed to membrane distillation crystallizer system (MDC). The rest of the process is similar to other examples. The advantage of this system may be to be able to reduce waste and to extract dissolved salts from MD reject brine solution for further use.

FIG. 13 shows a process using ceramic membrane as pretreatment to control inorganic fouling and TOC in the brackish water with VMD process. Then, water is passed to ceramic membrane (nano-size) to control TOC and to remove the salts causing hardness. The process is similar to FIG. 12 but differs only in that the water is not sent back to aeration system 200 from ceramic membrane 1202.

The foregoing examples have been provided for the purpose of explanation and should not be construed as limiting the present disclosure. While the present disclosure has been described with reference to an exemplary embodiment, changes may be made within the purview of the appended claims, without departing from the scope and spirit of the present disclosure in its aspects. Also, although the present disclosure has been described herein with reference to particular materials and embodiments, the present disclosure is not intended to be limited to the particulars disclosed herein; rather, the present disclosure extends to all functionally equivalent structures, methods and uses, such as are within the scope of the instant claims. Accordingly, the specification and drawings are to be regarded in an illustrative rather than in a restrictive sense.

What is claimed is:

1. An apparatus, comprising:
   an aeration system having a conical vessel, a smooth inner surface and a scrubber to separate a precipitating particle from a brackish water;
   a filtration unit to remove a suspended particle in the brackish water and sending a filtered water for further processing;
   a distillation system to process brackish water, wherein the distillation system is at least one of a vacuum membrane distillation system, a membrane distillation system, a direct contact membrane distillation and a membrane distillation bioreactor; and
   a crystallized unit connected to at least one of a membrane filtration system and a heat exchanger to collect at least one of the suspended particle and a concentrated particle for making an adsorbent.

2. The apparatus of claim 1, further comprising;
   a ceramic filter to remove a suspended particle in the brackish water and sending a filtered water at least one of the aeration system and a membrane filtration system.

3. The apparatus of claim 1, further comprising;
   a suction fan to collect an evaporated water for at least one of the aeration system and the filtration unit and sending it for further processing to at least one of the heat exchanger and a membrane units in parallel.

4. The apparatus of claim 1, further comprising;
   the heat exchanger to harness a retentate stream temperature produced by a membrane units in parallel and maintain the heat in the distillate water that is being desalinated.

5. The apparatus of claim 1, wherein the distillation system is a
   a membrane distillation unit comprising of several membrane units in parallel, having a hydrophobic membrane to filter at least one of a heated water from the heat exchanger, an evaporated water from a suction fan and a rejected water recirculated from the membrane distillation unit and produce distillate water for consumption.

6. The apparatus of claim 5, further comprising;
   a cooler to condense the distillate water produced as a water vapor from the membrane distillation unit for converting the water vapor into distillate water for consumption.

7. The apparatus of claim 5, further comprising;
   a vacuum pump to collect a water vapor from a permeate side of the membrane distillation unit and send it to at least one of the heat exchanger and the separate container for collecting distillate water.

8. A process of water desalination, comprising;
   pumping a brackish water from a well to an aeration system as a feed stream to remove a precipitating a soluble contaminant as a pretreatment of the brackish water to form a secondary brackish water for further processing;
   filtering the secondary brackish water to remove a contaminant and to reduce a fouling, using filter capable of removing suspended solids;
   distilling the filtered secondary brackish water using at least one of a vacuum membrane distillation system, a membrane distillation system, a direct contact membrane distillation and a membrane distillation bioreactor to produce at least two of a distillate water a permeate stream and a retentate stream of water;
   crystallizing the soluble contaminant from the retentate stream in a crystallizer to be used as an adsorbent; and
   collecting the distillate water that is desalinated in a distillate tank for human consumption.

9. The process of claim 8, further comprising;
   recirculating the retentate stream to harness the heat present in the retentate stream through the crystallizer to further heat the feed stream.

10. The process of claim 8, further comprising;
    mixing the crystallized soluble contaminants to the distillate water to make it palatable to human consumption.

11. The process of claim 8, further comprising;
    heating the feed stream using solar energy prior to aeration to precipitate the soluble contaminants.

12. The process of claim 8, wherein the filtering is performed using a ceramic filter.

13. The process of claim 8, wherein a hydrophobic PVDF membrane is used in the membrane distillation system.

* * * * *